United States Patent
Ding et al.

(10) Patent No.: US 11,891,744 B2
(45) Date of Patent: Feb. 6, 2024

(54) INTEGRATED WASHING AND SPINNING TUB AND ENERGY-SAVING AND HEALTHY HOUSEHOLD WASHING MACHINE WITH TUB REPLACING FUNCTION

(71) Applicant: Zhejiang University, Hangzhou (CN)

(72) Inventors: De Ding, Hangzhou (CN); Junxiang Yu, Hangzhou (CN); Yiqun Jin, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 246 days.

(21) Appl. No.: 17/218,375

(22) Filed: Mar. 31, 2021

(65) Prior Publication Data

US 2021/0310174 A1 Oct. 7, 2021

(30) Foreign Application Priority Data

Apr. 7, 2020 (CN) .......................... 202010265729.7

(51) Int. Cl.
| | | |
|---|---|---|
| *D06F 37/24* | (2006.01) | |
| *D06F 23/04* | (2006.01) | |
| *D06F 37/12* | (2006.01) | |
| *D06F 37/40* | (2006.01) | |

(52) U.S. Cl.
CPC .............. *D06F 37/24* (2013.01); *D06F 23/04* (2013.01); *D06F 37/12* (2013.01); *D06F 37/40* (2013.01)

(58) Field of Classification Search
None
See application file for complete search history.

(56) References Cited

U.S. PATENT DOCUMENTS

| 5,950,459 A | * | 9/1999 | Takagi | D06F 13/02 68/53 |
|---|---|---|---|---|
| 2011/0148260 A1 | * | 6/2011 | Silva | D06F 37/263 49/70 |
| 2011/0271719 A1 | * | 11/2011 | Fujitsuka | D06F 23/02 68/134 |
| 2012/0222454 A1 | * | 9/2012 | Park | D06F 37/30 68/133 |
| 2015/0000352 A1 | * | 1/2015 | Carr | D06F 17/10 68/133 |
| 2017/0002499 A1 | * | 1/2017 | Lv | F16H 3/666 |
| 2018/0149284 A1 | * | 5/2018 | Uchiyama | F16K 47/08 |

* cited by examiner

*Primary Examiner* — Cristi J Tate-Sims
(74) *Attorney, Agent, or Firm* — Gearhart Law, LLC; David Postolski

(57) ABSTRACT

Disclosed is an integrated washing and spinning tub and an energy-saving and healthy household washing machine with a tub replacing function. The integrated washing and spinning tub comprises a water holding tub, a spinning tub is arranged in the water holding tub, and the water holding tub and the spinning tub are connected in a sliding groove mode. The energy-saving and healthy household washing machine with a tub replacing function comprises a washing machine shell, the integrated washing and spinning tub is arranged in the washing machine shell, a spring telescopic support corresponding to the integrated washing and spinning tub is arranged on the inner wall of the upper portion of the washing machine shell, a support frame is arranged at the bottom of the integrated washing and spinning tub, and a reduction gear and a motor which are connected are arranged on the support frame.

13 Claims, 5 Drawing Sheets

INTEGRATED WASHING AND SPINNING TUB AND ENERGY-SAVING AND HEALTHY HOUSEHOLD WASHING MACHINE WITH TUB REPLACING FUNCTION

CROSS REFERENCE TO RELATED APPLICATION

This application is a U.S. Non-Provisional Application which claims priority to Chinese Application No. 202010265729.7 filed on Apr. 7, 2020, the disclosure is incorporated herein by reference.

TECHNICAL FIELD

The present disclosure relates to a washing machine, in particular to an integrated washing and spinning tub and an energy-saving and healthy household washing machine with a tub replacing function.

BACKGROUND

Traditional household washing machines generally include impeller washing machines and roller washing machines.

A disc impeller is arranged at the bottom of a tub of the impeller washing machine, and protruding ribs are arranged on the disc impeller. Under the driving of the impeller, water flow in the tub forms eddy current which rotates rightwards and leftwards, so that fabric is driven to rotate and roll along with the eddy current, and dirt on the clothes is removed. Washed objects are immersed in washing water and washed by means of continuous rotation or regular forward and reverse rotation of the impeller. The impeller washing machine mainly drives clothes and water to rotate through the rotation of the impeller, and washes the clothes under the action of a detergent through the friction between the impeller and the clothes, the friction between the clothes, the friction between the clothes and a tub wall and the scouring of water flow on the clothes.

An inner tub and an outer tub of the roller washing machine are horizontally arranged, washed objects are placed in a roller, part of the washed objects are immersed into water, and washing is performed through continuous rotation or regular forward and reverse rotation of the roller. Water is filled in the outer tub, part of clothes are immersed in the water, the inner tub rotates, protrusions are arranged on the wall of the inner tub and can drive the clothes to rise, and when the clothes reach the position close to the top, the clothes fall to the bottom of the tub under the action of gravity. The repeated beating is like a manual hammering clothes washing mode.

Existing impeller washing machines or roller washing machines have the disadvantages that water holding tubs (outer tubs) are fixedly connected with washing machine iron supports through fork-shaped frames, spinning tubs (inner tubs) or rollers are connected with spinning shafts of reduction gears through bolts, and for the impeller washing machines, impellers are connected with impeller shafts of the reduction gears through bolts.

At present, one of most washing machines is provided with one tub, one of a small number of washing machines is provided with two tubs so as to meet the washing requirements of different types of clothes, however, no matter one machine is provided with one tub or one machine is provided with two tub, washing and spinning tubs in the washing machines are fixedly connected, and professional tools and professionals are needed to disassemble inner and outer tubs. There are the following problems in product design:

Firstly, since the inner and outer tubs are difficult to disassemble, dirt is hidden in an interlayer between the inner tub and the outer tub of the washing machine after long-time use. A frequently-used washing machine is moist inwardly and prone to breeding various bacteria, if the washing machine is not cleaned in time, secondary pollution can be caused to clothes, and therefore the health of a user is affected. In order to guarantee the self-cleaning degree of the washing machine, the inner tub of the washing machine needs to be detached and washed regularly, but the operation needs to be completed by professionals, so that most families do not clean the washing machine for a long time.

Secondly, different types of clothes in most families, including but not limited to fabrics with different dirty degrees, such as underwear, coats, socks and beddings, dark-color and light-color fabrics with different colors, mesh fabrics, silk fabrics and other fabrics with different thicknesses, different types of plush fabrics or other special fabrics, such as different fiber raw material fabrics and the like, have the requirement of classified washing. A traditional washing machine with one tub cannot meet the requirement of classified washing.

Thirdly, due to the fact that only one outer tub is arranged in one washing machine and the capacity is determined, most of existing products adjust the water consumption according to the clothes washing amount, the adjusting precision is limited, the water consumption is large, and the energy consumption for rotation of a motor is large.

Therefore, the problem that existing inner and outer tubs are troublesome to disassemble and assemble exists in the prior art.

SUMMARY

The present disclosure aims to provide an integrated washing and spinning tub and an energy-saving and healthy household washing machine with a tub replacing function. The energy-saving and healthy household washing machine has the advantage of being convenient to assemble and disassemble.

According to the technical scheme of the present disclosure, the integrated washing and spinning tub comprises a water holding tub, a spinning tub is arranged in the water holding tub, and the water holding tub and the spinning tub are connected in a sliding groove mode.

In the integrated washing and spinning tub, a vertical sliding groove is formed in the inner wall of the water holding tub, and a horizontal annular sliding groove is formed in the bottom of the vertical sliding groove.

In the integrated washing and spinning tub, pin holes are further formed in the side wall of the upper end of the water holding tub, and plug pins are arranged in the pin holes.

In the integrated washing and spinning tub, a mounting through hole is formed in the middle of the bottom of the water holding tub; and a drainage port is further formed in the bottom of the water holding tub, a drainage guide pipe is arranged on the drainage port, an overflow hole is further formed in the upper portion of the water holding tub, and an overflow guide pipe is arranged in the overflow hole.

In the integrated washing and spinning tub, the spinning tub comprises a tub body, a group of outer sliding rods which are annularly arranged at intervals are arranged on the outer wall of the tub body, and outer universal balls are arranged at the ends of the outer sliding rods; an inner vertical sliding groove is formed in the inner wall of the tub body, an inner horizontal annular sliding groove is formed in the bottom of the inner vertical sliding groove, and dewatering holes are further evenly formed in the side wall of the tub body; and a spinning tub splined hole is formed in the middle of the bottom of the tub body.

In the integrated washing and spinning tub, an impeller is arranged at the bottom of the spinning tub, a group of impeller sliding rods which are annularly arranged at intervals are arranged on the edge of the impeller, and inner universal balls are arranged at the ends of the impeller sliding rods; and an impeller splined hole is formed in the middle of the impeller.

An energy-saving and healthy household washing machine with a tub replacing function comprises a washing machine shell, the integrated washing and spinning tub is arranged in the washing machine shell, a spring telescopic support corresponding to the integrated washing and spinning tub is arranged on the inner wall of the upper portion of the washing machine shell, a support frame is arranged at the bottom of the integrated washing and spinning tub, and a reduction gear and a motor which are connected are arranged on the support frame.

In the energy-saving and healthy household washing machine with a tub replacing function, a spinning splined shaft and an impeller splined shaft are arranged at the upper end of the reduction gear, the spinning splined shaft is matched with the spinning tub splined hole, and the impeller splined shaft is matched with the impeller splined hole.

In the energy-saving and healthy household washing machine with a tub replacing function, a cover plate is further arranged at the upper end of the washing machine shell, and a water inlet pipe and a water inlet electromagnetic valve are further arranged on one side of the top of the washing machine shell.

In the energy-saving and healthy household washing machine with a tub replacing function, a drainage pipe corresponding to the drainage guide pipe is arranged at the bottom of the washing machine shell, and the drainage guide pipe is inserted into the drainage pipe; the drain pipe is further connected with an overflow pipe matched with the overflow guide pipe; and a drainage electromagnetic valve is further arranged on the drainage pipe.

Compared with the prior art, the washing machine has the advantages that the water holding tub and the spinning tub are combined into a whole in a sliding groove mode, the whole washing machine is convenient to disassemble and assemble, the inner tub and the outer tub are convenient to disassemble, replace and clean, and compared with an inner tub and an outer tub of a conventional washing machine, operation of professional tools and professionals is not needed; and therefore, the whole washing and spinning tub is convenient to disassemble and assemble. Moreover, by setting the spring telescopic support on the machine wall, the washing machine can adapt to water holding tubs with different sizes, the effect of one machine with multiple tubs is achieved, different washing requirements are met through multi-tub configuration, the purpose that different washing tubs are adopted for different capacities and different fabric types is achieved, and meanwhile compared with a multi-tub household washing machine, the size of the household washing machine is not increased; and multiple tub can be stacked and stored when not in use, so that no space is occupied.

The washing machine with a tub replacing function is suitable for occasions where the washing tub of the washing machine is replaced and cleaned according to different washing types in household. Due to separated-tub cleaning, cross infection of bacteria among different clothes can be avoided, and accurate classification and professional washing are truly realized. Meanwhile, the inner tubs with different sizes are selected according to different clothes washing amounts, the water consumption and the energy consumption are automatically adjusted, and the purposes of energy conservation and water conservation are achieved. The tubs are convenient to replace, the outer tub is pluggable, and the inner tub is detachable, so that the tubs are convenient to clean and easy to clean; and when not working, the inner and outer tubs can be placed in the washing machine after being dried, so that bacteria breeding is avoided, and the cleaning degree of the washing machine is ensured.

Reference signs in drawings: 1, water holding tub; 2, spinning tub; 3, plug pin; 4, mounting through hole; 5, drainage guide pipe; 6, overflow guide pipe; 7, impeller; 8, washing machine shell; 9, spring telescopic support; 10, support frame; 11, reduction gear; 12, motor; 13, cover plate; 14, water inlet pipe; 15, water inlet electromagnetic valve; 16, drainage pipe; 17, overflow pipe; 18, drainage electromagnetic valve; 101, vertical sliding groove; 102, horizontal annular sliding groove; 201, tub body; 202, outer sliding rod; 203, outer universal ball; 204, inner vertical sliding groove; 205, inner horizontal annular sliding groove; 206, spinning hole; 207, spinning tub splined hole; 701, inner sliding rod; 702, inner universal ball; 703, impeller splined hole; 1101, spinning splined shaft; and 1102, impeller splined shaft.

DETAILED DESCRIPTION

The present disclosure is further illustrated below in combination with the attached figures and embodiment but not as a basis for the limitation of the present disclosure.

Figure 1:
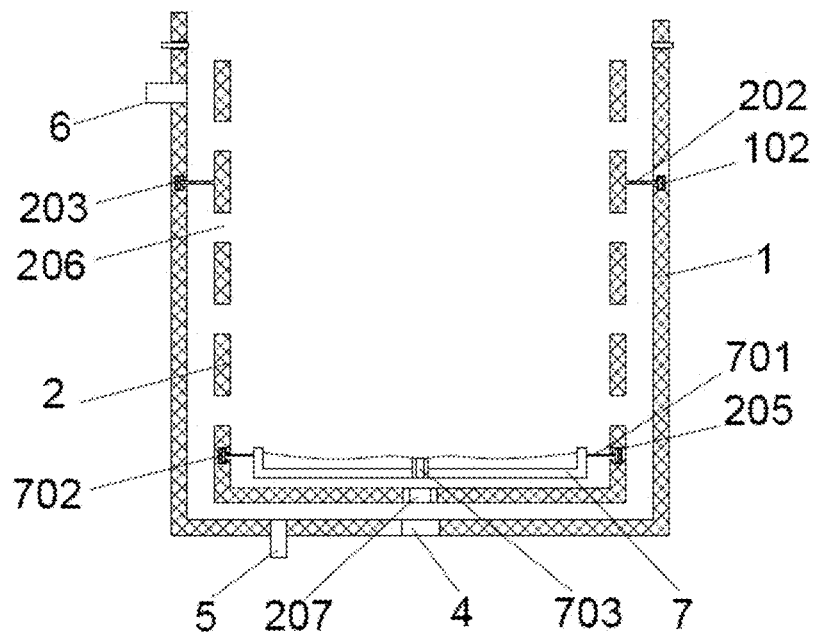
FIG. 1 is a structural schematic diagram of an integrated washing and spinning tub.
Figure 2:
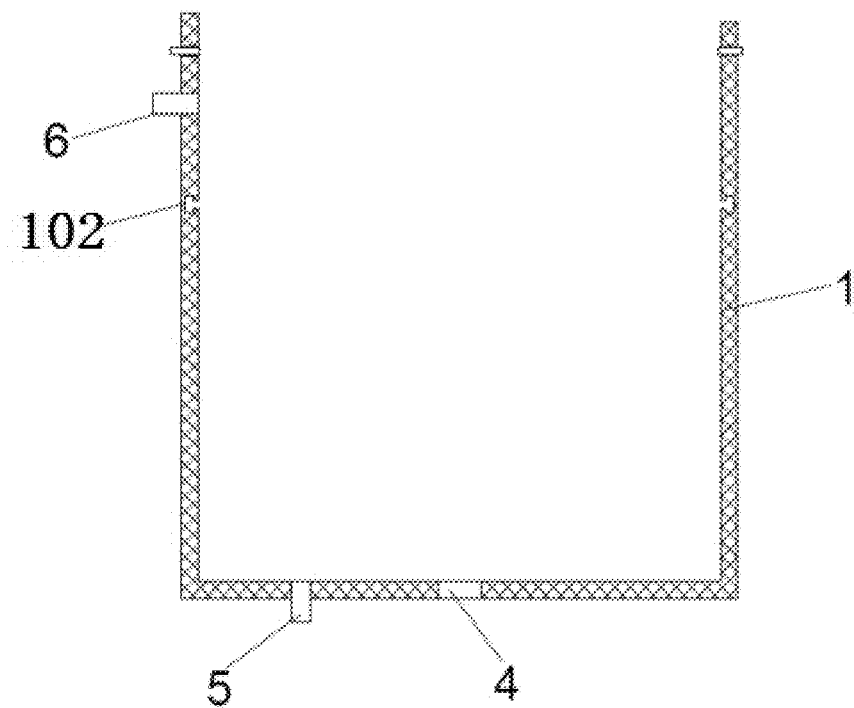
FIG. 2 is a mechanism side view of a water holding tub.
Figure 3:
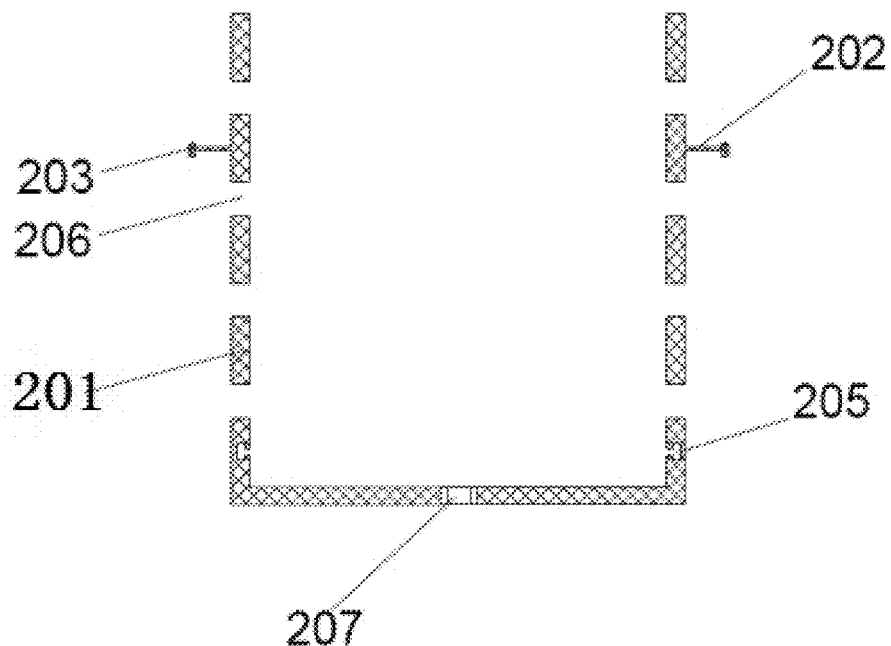
FIG. 3 is a structure side view of a spinning tub.
Figure 4:
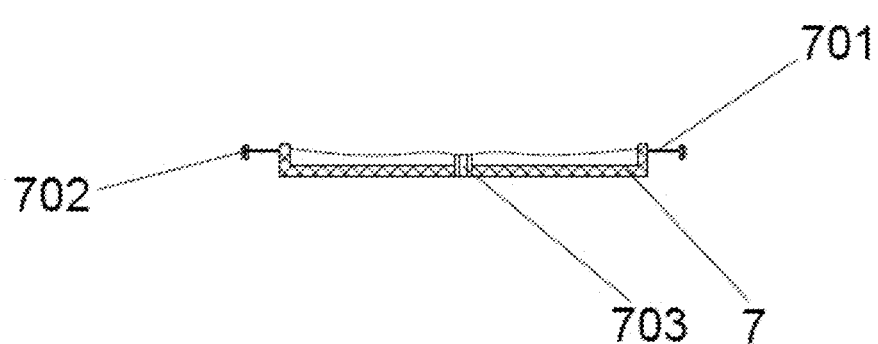
FIG. 4 is a structure side view of an impeller.
Figure 5:
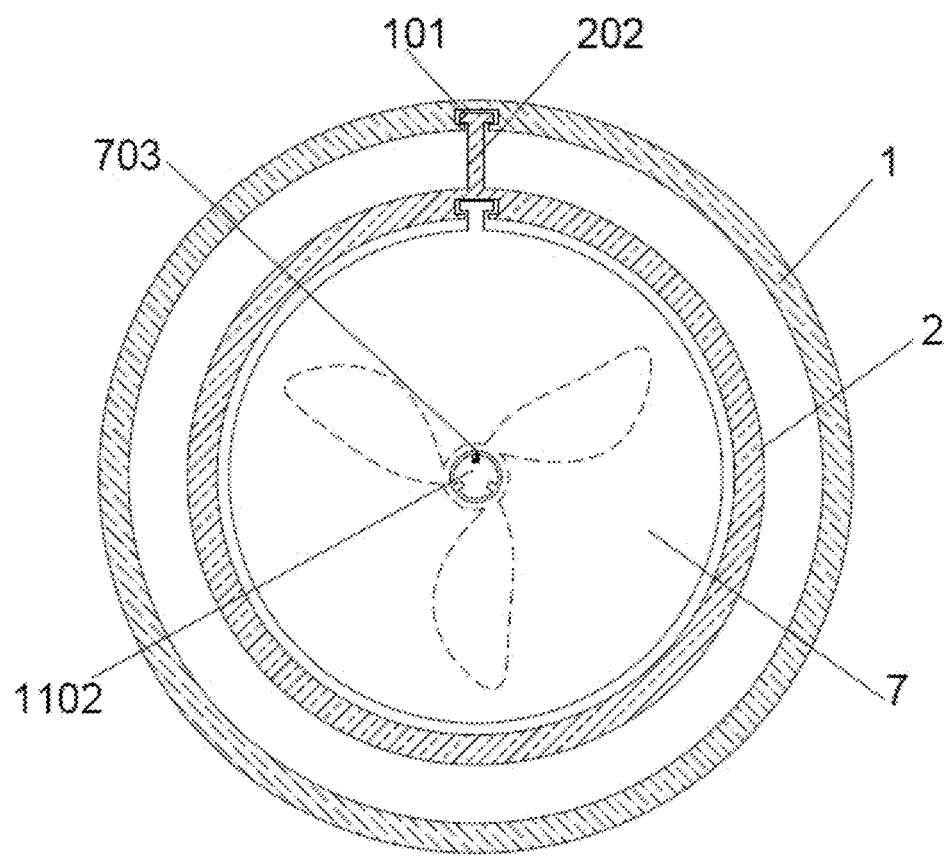
FIG. 5 is a mounting top view of the impeller.
Figure 6:
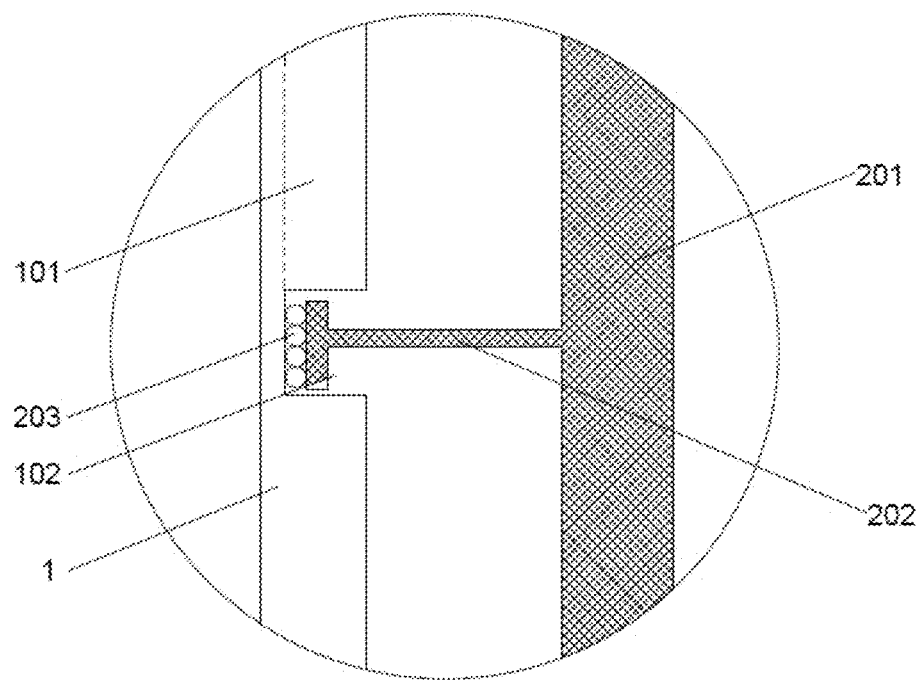
FIG. 6 is a structure view of a vertical sliding groove and a horizontal annular sliding groove in the water holding tub.
Figure 7:
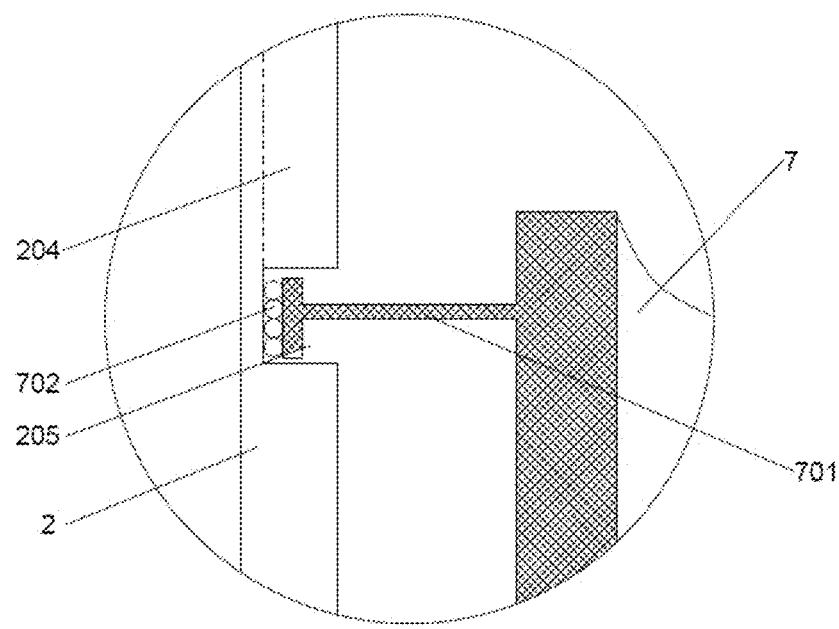
FIG. 7 is a structure view of an impeller, as well as an inner vertical sliding groove and an inner horizontal annular sliding groove in the spinning tub.
Figure 8:
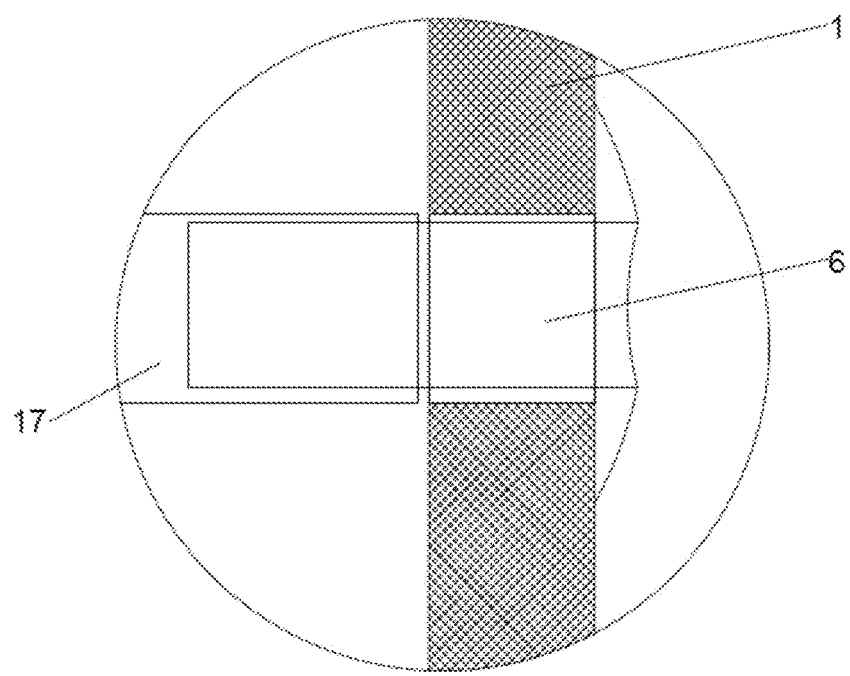
FIG. 8 is a structure view of an overflow guide pipe at the upper end of the water holding tub and an overflow pipe.
Figure 9:
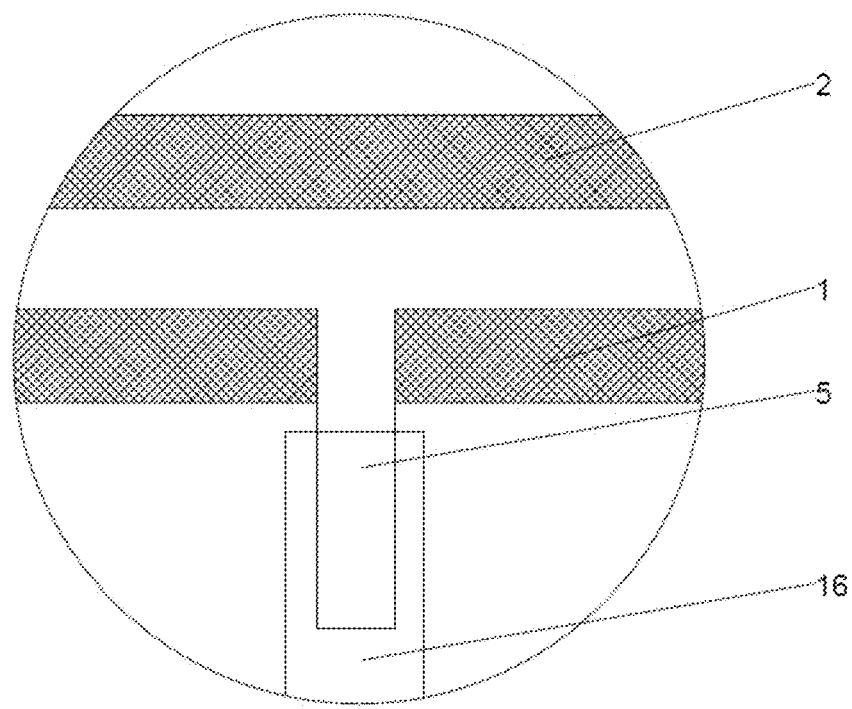
FIG. 9 is a structure view of a drainage guide pipe at the bottom of the water holding tub and a drainage pipe.
Figure 10:
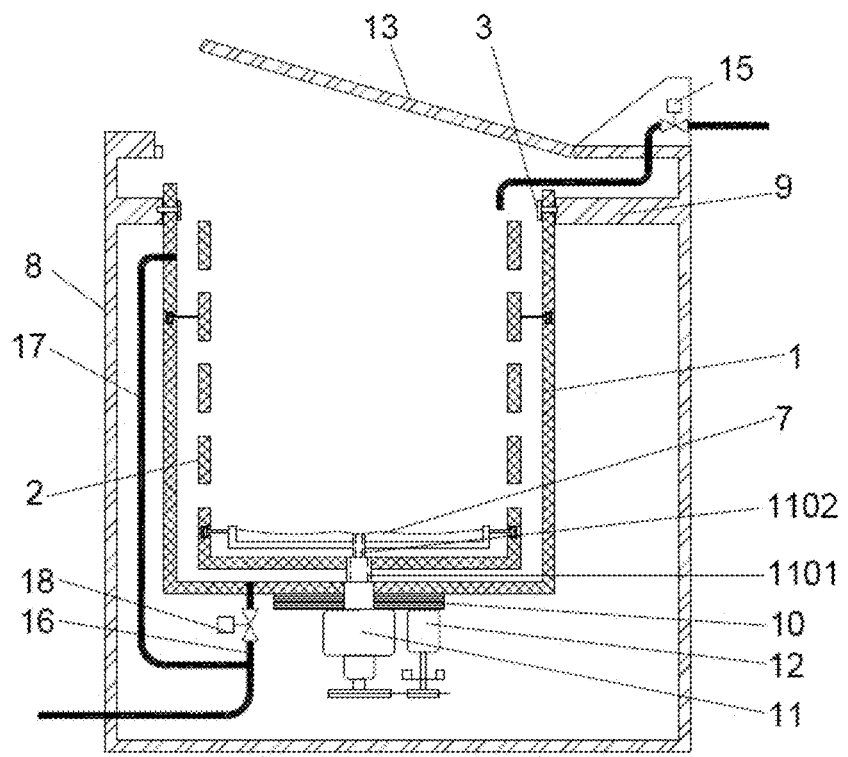
FIG. 10 is a structural schematic diagram of a washing machine in the present disclosure.

In the embodiment, an integrated washing and spinning tub, as shown in FIG. 1 to FIG. 10, comprises a water holding tub 1, a spinning tub 2 is arranged in the water holding tub 1, and the water holding tub 1 and the spinning tub 2 are connected in a sliding groove mode.

A vertical sliding groove 101 is formed in the inner wall of the water holding tub 1, and a horizontal annular sliding groove 102 is formed in the bottom of the vertical sliding groove 101.

Pin holes are further formed in the side wall of the upper end of the water holding tub 1, and plug pins 3 are arranged in the pin holes.

A mounting through hole 4 is formed in the middle of the bottom of the water holding tub 1; and a drainage port is further formed in the bottom of the water holding tub 1, a drainage guide pipe 5 is arranged on the drainage port, an overflow hole is further formed in the upper portion of the water holding tub 1, and an overflow guide pipe 6 is arranged in the overflow hole.

The spinning tub 2 comprises a tub body 201, a group of outer sliding rods 202 which are annularly arranged at intervals are arranged on the outer wall of the tub body 201, and outer universal balls 203 are arranged at the ends of the outer sliding rods 202; an inner vertical sliding groove 204 is formed in the inner wall of the tub body 201, an inner horizontal annular sliding groove 205 is formed in the bottom of the inner vertical sliding groove 204, and dewatering holes 206 are further evenly formed in the side wall of the tub body 201; and a spinning tub splined hole 207 is formed in the middle of the bottom of the tub body 201.

An impeller 7 is arranged at the bottom of the spinning tub 2, a group of impeller sliding rods 701 which are annularly arranged at intervals are arranged on the edge of the impeller 7, and inner universal balls 702 are arranged at the ends of the impeller sliding rods 701; and an impeller splined hole 703 is formed in the middle of the impeller 7.

An energy-saving and healthy household washing machine with a tub replacing function comprises a washing machine shell 8, the integrated washing and spinning tub is arranged in the washing machine shell 8, a spring telescopic support 9 corresponding to the integrated washing and spinning tub is arranged on the inner wall of the upper portion of the washing machine shell 8, a support frame 10 is arranged at the bottom of the integrated washing and spinning tub, and a reduction gear 11 and a motor 12 which are connected are arranged on the support frame 10.

A spinning splined shaft 1101 and an impeller splined shaft 1102 are arranged at the upper end of the reduction gear 11, the spinning splined shaft 1101 is matched with the spinning tub splined hole 207, and the impeller splined shaft 1102 is matched with the impeller splined hole 703.

A cover plate 13 is further arranged at the upper end of the washing machine shell 8, and a water inlet pipe 14 and a water inlet electromagnetic valve 15 are further arranged on one side of the top of the washing machine shell 8.

A drainage pipe 16 corresponding to the drainage guide pipe 5 is arranged at the bottom of the washing machine shell, and the drainage guide pipe 5 is inserted into the drainage pipe 16; the drainage pipe 16 is further connected with an overflow pipe 17 matched with the overflow guide pipe 6; and a drainage electromagnetic valve 18 is further arranged on the drainage pipe 16.

The outer sliding rods are matched with the vertical sliding groove 101 and the horizontal annular sliding groove 102 in the water holding tub 1.

The impeller sliding rods 701 are matched with the inner vertical sliding groove 204 and the inner horizontal annular sliding groove 205.

The tub assembling and disassembling process comprises the steps that the spring telescopic support on the machine wall is adjusted to a needed position and clamped, the integrated washing and spinning tub is aligned with a supporting frame shaft and a spinning tub splined shaft of the reduction gear along a through hole and the spinning tub splined hole to be inserted, and the drainage guide pipe is inserted into the drainage pipe, the overflow guide pipe is inserted into the overflow pipe, an overflow sealing ring is pressed, the plug pins are matched with the spring telescopic support and the washing machine shell, so that the integrated washing and spinning tub is mounted; and then the impeller is mounted in the integrated washing and spinning tub, inner universal rollers at the ends of the impeller sliding rods are inserted along the inner vertical sliding groove, the impeller splined hole is aligned with the impeller splined shaft of the reduction gear and then slides into the inner horizontal annular sliding groove of the spinning tub, and mounting of the impeller is achieved, vice versa in tub disassembling process.

The process of only assembling the spinning tub comprises the steps that the inner sliding rods slide into the horizontal annular sliding groove of the water holding tub along the vertical sliding groove of the water holding tub, vice versa in the tub disassembling process.

Through multi-tub configuration, for a conventional family, the capacity and various specification moduli of washing tubs are configured, and the position of a clamping groove of the spring telescopic support 9 is standardized. The specification moduli are 10 kg (used for washing large fabrics such as curtains and blankets), 8 kg (used for washing thick and heavy fabrics), 6 kg (used for washing conventional fabrics), 4 kg (used for washing small fabrics) and 2 kg (used for washing infant fabrics). The size of the washing tub is based on nestable storage.

What is claimed is:

1. An energy-saving and healthy household washing machine with a tub replacing function, comprising a washing machine shell (8), wherein an integrated washing and spinning tub, comprising a water holding tub (1), wherein a spinning tub (2) is arranged in the water holding tub (1), and the water holding tub (1) and the spinning tub (2) are connected in a sliding groove mode, the integrated washing and spinning tub is arranged in the washing machine shell (8), a spring telescopic support (9) corresponding to the integrated washing and spinning tub is arranged on an inner wall of an upper portion of the washing machine shell (8), a support frame (10) is arranged at a bottom of the integrated washing and spinning tub, and a reduction gear (11) and a motor (12) which are connected are arranged on the support frame (10); wherein a vertical sliding groove (101) is formed in the inner wall of the water holding tub (1), and a horizontal annular sliding groove (102) is formed in the bottom of the vertical sliding groove (101).

2. The energy-saving and healthy household washing machine with a tub replacing function according to claim 1, wherein pin holes are further formed in the side wall of the upper end of the water holding tub (1), and plug pins (3) are arranged in the pin holes.

3. The energy-saving and healthy household washing machine with a tub replacing function according to claim 1, wherein a mounting through hole (4) is formed in the middle of the bottom of the water holding tub (1); and a drainage port is further formed in the bottom of the water holding tub (1), a drainage guide pipe (5) is arranged on the drainage port, an overflow hole is further formed in the upper portion of the water holding tub (1), and an overflow guide pipe (6) is arranged in the overflow hole.

4. The energy-saving and healthy household washing machine with a tub replacing function according to claim 1, wherein the spinning tub (2) comprises a tub body (201), a group of outer sliding rods (202) which are annularly arranged at intervals are arranged on the outer wall of the tub body (201), and outer universal balls (203) are arranged at the ends of the outer sliding rods (202); an inner vertical sliding groove (204) is formed in the inner wall of the tub body (201), an inner horizontal annular sliding groove (205) is formed in the bottom of the inner vertical sliding groove (204), and spinning holes (206) are further evenly formed in the side wall of the tub body (201); and a spinning tub splined hole (207) is formed in the middle of the bottom of the tub body (201).

5. The energy-saving and healthy household washing machine with a tub replacing function according to claim 4, wherein an impeller (7) is arranged at the bottom of the spinning tub (2), a group of impeller sliding rods (701) which are annularly arranged at intervals are arranged on the edge of the impeller (7), and inner universal balls (702) are arranged at the ends of the impeller sliding rods (701); and an impeller splined hole (703) is formed in the middle of the impeller (7).

6. The energy-saving and healthy household washing machine with a tub replacing function according to claim 1, wherein a spinning splined shaft (1101) and an impeller splined shaft (1102) are arranged at the upper end of the reduction gear (11), the spinning splined shaft (1101) is matched with a spinning tub splined hole (207), and the impeller splined shaft (1102) is matched with an impeller splined hole (703).

7. The energy-saving and healthy household washing machine with a tub replacing function according to claim 1, wherein a spinning splined shaft (1101) and an impeller splined shaft (1102) are arranged at the upper end of the reduction gear (11), the spinning splined shaft (1101) is matched with a spinning tub splined hole (207), and the impeller splined shaft (1102) is matched with an impeller splined hole (703).

8. The energy-saving and healthy household washing machine with a tub replacing function according to claim 2, wherein a spinning splined shaft (1101) and an impeller splined shaft (1102) are arranged at the upper end of the reduction gear (11), the spinning splined shaft (1101) is matched with a spinning tub splined hole (207), and the impeller splined shaft (1102) is matched with an impeller splined hole (703).

9. The energy-saving and healthy household washing machine with a tub replacing function according to claim 3, wherein a spinning splined shaft (1101) and an impeller splined shaft (1102) are arranged at the upper end of the reduction gear (11), the spinning splined shaft (1101) is matched with a spinning tub splined hole (207), and the impeller splined shaft (1102) is matched with an impeller splined hole (703).

10. The energy-saving and healthy household washing machine with a tub replacing function according to claim 4, wherein a spinning splined shaft (1101) and an impeller splined shaft (1102) are arranged at the upper end of the reduction gear (11), the spinning splined shaft (1101) is matched with the spinning tub splined hole (207), and the impeller splined shaft (1102) is matched with an impeller splined hole (703).

11. The energy-saving and healthy household washing machine with a tub replacing function according to claim 5, wherein a spinning splined shaft (1101) and an impeller splined shaft (1102) are arranged at the upper end of the reduction gear (11), the spinning splined shaft (1101) is matched with the spinning tub splined hole (207), and the impeller splined shaft (1102) is matched with the impeller splined hole (703).

12. The energy-saving and healthy household washing machine with a tub replacing function according to claim 1, wherein a cover plate (13) is further arranged at the upper end of the washing machine shell (8), and a water inlet pipe (14) and a water inlet electromagnetic valve (15) are further arranged on one side of the top of the washing machine shell (8).

13. The energy-saving and healthy household washing machine with a tub replacing function according to claim 3, wherein a drainage pipe (16) corresponding to the drainage guide pipe (5) is arranged at the bottom of the washing machine shell, and the drainage guide pipe (5) is inserted into the drainage pipe (16); the drainage pipe (16) is further connected with an overflow pipe (17) matched with the overflow guide pipe (6); and a drainage electromagnetic valve (18) is further arranged on the drainage pipe (16).

\* \* \* \* \*